(12) United States Patent
Hamilton

(10) Patent No.: US 12,543,636 B2
(45) Date of Patent: Feb. 10, 2026

(54) METHODS AND SYSTEMS FOR LABELING HAY WITH CORRECTED YIELD

(71) Applicant: AGCO Corporation, Duluth, GA (US)

(72) Inventor: Kevin J. Hamilton, Newton, KS (US)

(73) Assignee: AGCO Corporation, Duluth, GA (US)

( * ) Notice: Subject to any disclaimer, the term of this patent is extended or adjusted under 35 U.S.C. 154(b) by 127 days.

(21) Appl. No.: 18/551,808

(22) PCT Filed: Mar. 30, 2022

(86) PCT No.: PCT/IB2022/052937
§ 371 (c)(1),
(2) Date: Sep. 21, 2023

(87) PCT Pub. No.: WO2022/229736
PCT Pub. Date: Nov. 3, 2022

(65) Prior Publication Data
US 2024/0164250 A1  May 23, 2024

Related U.S. Application Data

(60) Provisional application No. 63/179,648, filed on Apr. 26, 2021.

(51) Int. Cl.
*A01D 34/00* (2006.01)
*A01D 43/06* (2006.01)

(52) U.S. Cl.
CPC ......... *A01D 34/006* (2013.01); *A01D 43/06* (2013.01)

(58) Field of Classification Search
CPC ...... A01D 34/006; A01D 43/06; A01D 61/00; A01D 43/10; A01B 79/005
See application file for complete search history.

(56) References Cited

U.S. PATENT DOCUMENTS

| | | |
|---|---|---|
| 6,370,852 B1 | 4/2002 | Ohlemeyer et al. |
| 6,378,276 B1 | 4/2002 | Dorge et al. |
| 8,291,687 B2 | 10/2012 | Herron et al. |
| 8,833,247 B2 | 9/2014 | Olander |
| 10,657,433 B2 | 5/2020 | Hamilton et al. |
| 2004/0002368 A1* | 1/2004 | Shinners |
| 2007/0175341 A1 | 8/2007 | Roberts |
| 2013/0152534 A1 | 6/2013 | Clark |

(Continued)

FOREIGN PATENT DOCUMENTS

| | | | | |
|---|---|---|---|---|
| DE | 102013207281 A1 * | 10/2013 | ............. | A01F 15/08 |
| EP | 3020266 A2 * | 5/2016 | ............. | A01D 90/12 |

(Continued)

OTHER PUBLICATIONS

Karl Wild, Apr. 23, 2012, English Machine Translation_ DE102013207281A1 provided by Patent Translate by EPO and Google (Year: 2012).*

(Continued)

*Primary Examiner* — Ashley L Redhead, Jr.

(57) ABSTRACT

A method includes cutting hay in an agricultural field, determining a mass of the hay, determining a moisture content of the hay, determining an ash content of the hay, calculating a corrected yield of the hay, and labeling the hay with an indicator of the corrected yield of the hay. The corrected yield is based on the mass, the moisture content, and the ash content of the hay.

13 Claims, 5 Drawing Sheets

(56) References Cited

U.S. PATENT DOCUMENTS

| | | |
|---|---|---|
| 2015/0310323 A1 | 10/2015 | Foster et al. |
| 2017/0013772 A1* | 1/2017 | Kirk |
| 2018/0332773 A1 | 11/2018 | Roberts |
| 2019/0124850 A1 | 5/2019 | Okamura et al. |
| 2020/0264107 A1 | 8/2020 | Bertolani et al. |
| 2023/0066442 A1 | 3/2023 | Hamilton et al. |
| 2023/0136092 A1 | 5/2023 | Honeyman |

FOREIGN PATENT DOCUMENTS

| | | |
|---|---|---|
| EP | 3020266 B1 | 4/2018 |
| WO | 2021214572 A1 | 10/2021 |
| WO | 2021214580 A1 | 10/2021 |

OTHER PUBLICATIONS

European Patent Office, Search report for related PCT Application No. PCT/IB2022/052937, dated Jun. 9, 2022, 11 pages.
Uk Intellectual Property Office, Search report for related UK Application No. GB2106384.7, dated Nov. 3, 2021, 3 pages.

\* cited by examiner

METHODS AND SYSTEMS FOR LABELING HAY WITH CORRECTED YIELD

CROSS REFERENCE TO RELATED APPLICATIONS

This application is a national phase entry under 35 U.S.C. § 371 of International Patent Application PCT/IB2022/052937, filed Mar. 30, 2022, designating the United States of America and published in English as International Patent Publication WO 2022/229736A1 on Nov. 3, 2022, which claims the benefit of the filing date of U.S. Patent Application 63/179,648 "Methods and Systems for Labeling Hay Bales with Corrected Yield," filed Apr. 26, 2021, the entire disclosure of which is incorporated herein by reference.

FIELD

Embodiments of the present disclosure relate generally to methods of identifying and labeling the yield of hay, which may be defined as the dry organic mass or the mass of protein in the hay.

BACKGROUND

Windrowers and other self-propelled harvesters have long been used to harvest crops for hay and forage. A conventional windrower includes a laterally extending header supported by a windrower chassis. As the windrower is advanced through a field, the header severs a swath of standing forage plants, such as grasses, alfalfa, wheat, etc. The header also collects the severed forage material and discharges the material rearward onto the ground in the form of a windrow extending behind the windrower. Windrowers can employ different types of headers, including sickle headers and rotating disc headers.

Hay is harvested in a field with varying attributes, such as moisture content, ash content, fiber content, protein content, and total mass per unit field area. The attributes can vary between fields and at individual points within the field. Each attribute affects the final value of the hay because it affects the number of animals that the hay can feed.

BRIEF SUMMARY

In some embodiments, a method includes cutting hay in an agricultural field, determining a mass of the hay, determining a moisture content of the hay, determining an ash content of the hay, calculating a corrected yield of the hay, and labeling the hay with an indicator of the corrected yield of the hay. The corrected yield is based on the mass, the moisture content, and the ash content of the hay.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments of the disclosure when read in conjunction with the accompanying drawings, in which:

DETAILED DESCRIPTION

Figure 1:
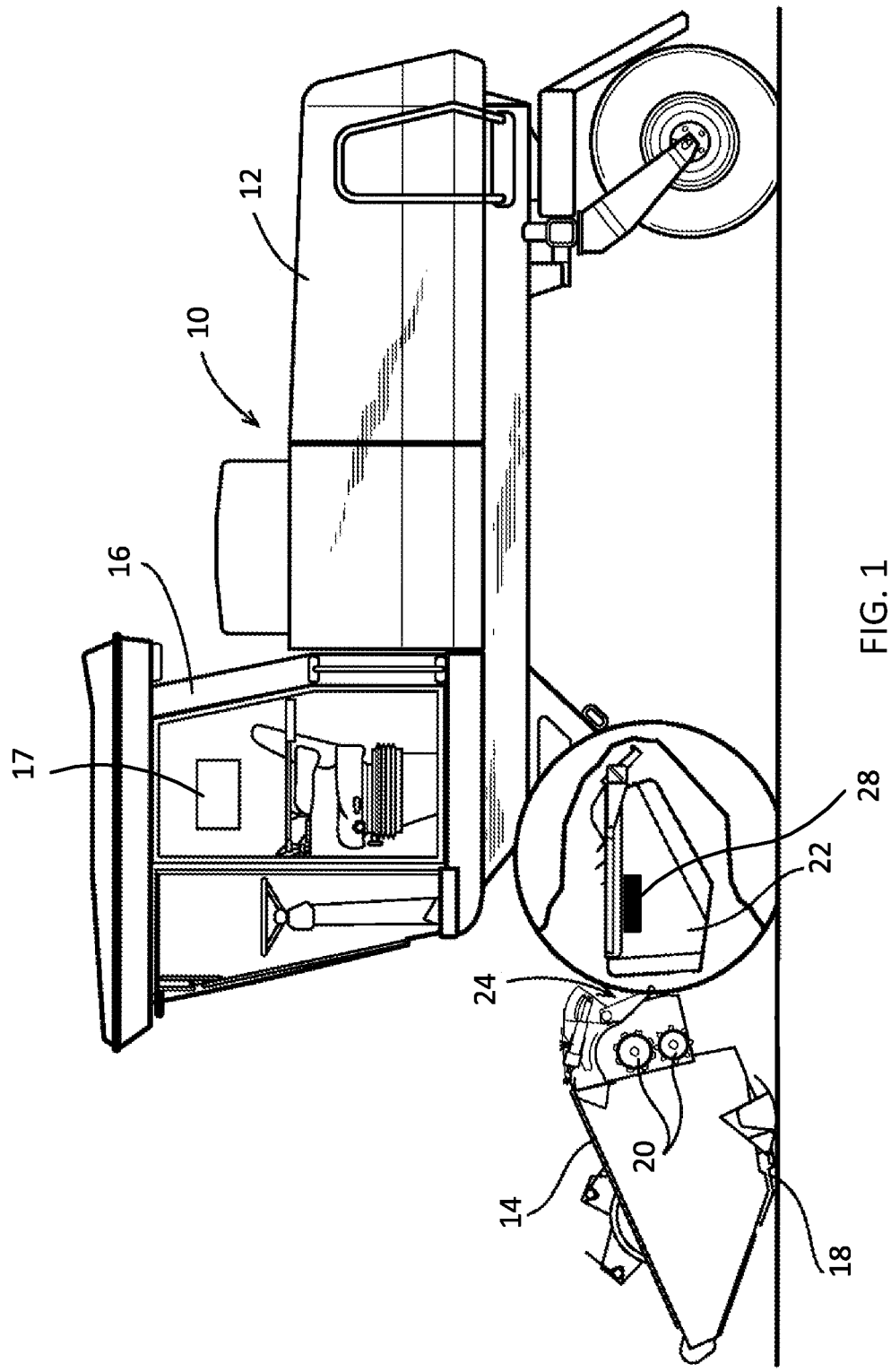
FIG. 1 is a simplified side view of a self-propelled windrower.

The illustrations presented herein are not actual views of any agricultural machine or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Methods described herein may be used to determine a corrected yield of hay or other crop material and label the hay with the corrected yield. For example, the corrected yield may account for variations in moisture content, ash content, and protein content. The corrected yield may be useful to determine the quantity of hay needed to support a given number of animals.

FIG. 1 is a simplified side view of an example agricultural machine depicted as self-propelled windrower 10. In some embodiments, pull-type or other types of harvesting machines may be used, such as mowers, including a mounted mower frame, a triple mower, or a pull-type mower. The windrower 10 broadly includes a self-propelled tractor 12 and a header 14 attached to and carried by the front of the tractor 12. In some embodiments, the header 14 may be a mower or a hay header. The operator drives the windrower 10 from a cab 16, which includes an operator station having a tractor seat and one or more user interfaces (e.g., FNR joystick, display monitor, switches, buttons, etc.) that enable the operator to control various functions of the tractor 12 and header 14. In one embodiment, a data processor 17 or computing system is disposed in the cab 16, though in some embodiments, the data processor 17 may be located elsewhere or include a distributed architecture having plural computing devices, coupled to one another in a network, throughout various locations within the tractor 12 (or in some embodiments, located in part externally and in remote communication with one or more local computing devices).

The header 14 includes a cutter 18, a conditioning system, and a forming assembly, which may include forming shields 22 and/or a swathboard 24. The cutter 18 is configured for severing standing crops as the windrower 10 moves through the field. The conditioning system, in the depicted embodiment, includes one or more pairs of conditioner rolls 20. The forming assembly may include a pair of rearwardly converging windrow forming shields 22 located behind the conditioner rolls 20. The swathboard 24 is located between the conditioner rolls 20 and the forming shields 22. In some embodiments, the conditioning system may be of a different design, such as a flail-type conditioning system. In self-propelled harvesters, the forming shields 22 are typically supported partly by the header 14 and partly by the tractor 12, while in pull-type harvesters the forming shields are typically carried by the header only. In some embodiments, the forming assembly may be carried by the tractor 12. In other embodiments, the forming assembly may be differently configured (e.g., using a single shield or additional shields of the same or different geometric configuration) to form harvested crop into a windrow having a selected width or shape.

The conditioner rolls 20, depicted in FIG. 1 as a single pair (though an additional pair may be used in some embodiments), project a stream of conditioned crop material rearward and toward the swathboard 24 and the forming shields 22 as the crop material issues from the conditioner rolls 20. In FIG. 1, the swathboard 24 is in a lowered position. The swathboard 24 may be raised and lowered to change the flow of crop material.

Figure 2:
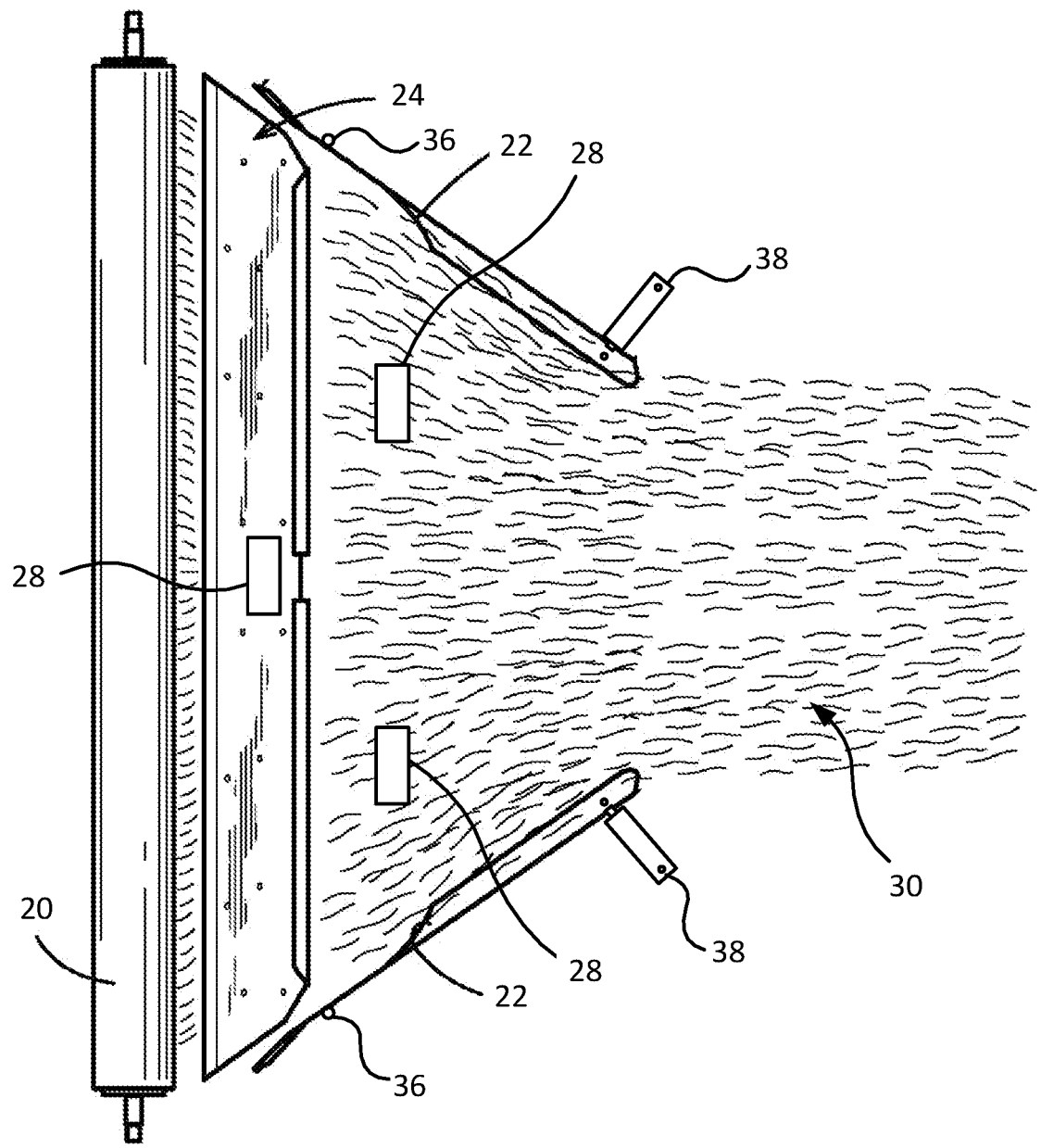
FIG. 2 is a simplified top view of cut crop material passing through conditioner rolls of the windrower of FIG. 1 and pushed inward by forming shields to form a windrow.

FIG. 2 is a simplified top view of the conditioner rolls 20, swathboard 24, and forming shields 22 forming a windrow of crop material 30 (e.g., hay). The forming shields 22 may each be fixed to a pivot 36 attached to the windrower 10 or otherwise mounted to enable the forming shields 22 to rotate. Actuators 38 may also connect the forming shields 22 to the windrower 10. The actuators 38 may enable movement of the forming shields 22 outward. The actuators 38 may include electromechanical actuators, pneumatic actuators, magnetic actuators, hydraulic actuators, etc., and may operate, for example, with linear or rotary mechanisms. In some embodiments, the actuators 38 may contain reversible electric motors that drive worm gears to extend and retract moving components (e.g., rods) of the actuators 38. Movement of the swathboard 24 and forming shields 22 is described in more detail in International Patent Application PCT/IB2021/052879, "Agricultural Machines and Methods for Controlling Windrow Properties," filed Apr. 7, 2021.

The windrower 10 may carry one or more sensors 28 configured to determine a property of the crop material 30. For example, a sensor 28 may be carried by the windrower 10 or the header 14 such that it can measure the crop material 30 being cut by the header 14 and formed into a windrow. The sensor 28 may communicate with the data processor 17 such that the data processor 17 can record information about the crop material.

For example, the sensor(s) 28 may measure the mass of crop material 30 cut by the header 14, the moisture content of the crop material 30, the ash content of the crop material 30, and/or the protein content of the crop material 30. Though depicted as a single sensor 28 in FIG. 1, the windrower 10 may include multiple sensors that measure the same or different properties. For example, FIG. 2 illustrates three sensors 28 located to measure crop at different parts of the header 14. In certain embodiments, the sensor 28 may be a part of or attached to the swathboard 24 or the forming shields 22. As another example, a transducer may measure the force of the crop material 30 hitting the swathboard 24 or forming shields 22, and that force may be related to the mass of crop material 30 cut.

In some embodiments, the sensor 28 may include a capacitive sensor, such as disclosed in U.S. Pat. No. 10,657,433, "Bale Identification Assembly for Binding an Identification Tag to a Bale of Agricultural Crop Material," granted May 19, 2020; International Patent Application PCT/IB2021/052877, "Agricultural Machines Comprising Capacitive Sensors, and Related Methods and Apparatus," filed Apr. 7, 2021; and International Patent Application PCT/IB2021/052488, "Methods of Measuring Harvested Crop Material," filed Mar. 25, 2021. Capacitive sensors may be used to determine the moisture content of hay. In certain embodiments, the sensor may include a near-IR sensor configured to detect ash content (i.e., non-crop material such as mineral or contaminants) or protein content of the hay. For example, the sensor may include a diode array spectrometer in a measuring head, such as a spectrometer available from Carl Zeiss Spectroscopy GmbH, of Jena, Germany, under the name ZEISS Corona® extreme. The properties of the hay may be measured as the hay passes the sensor 28.

Figure 3:
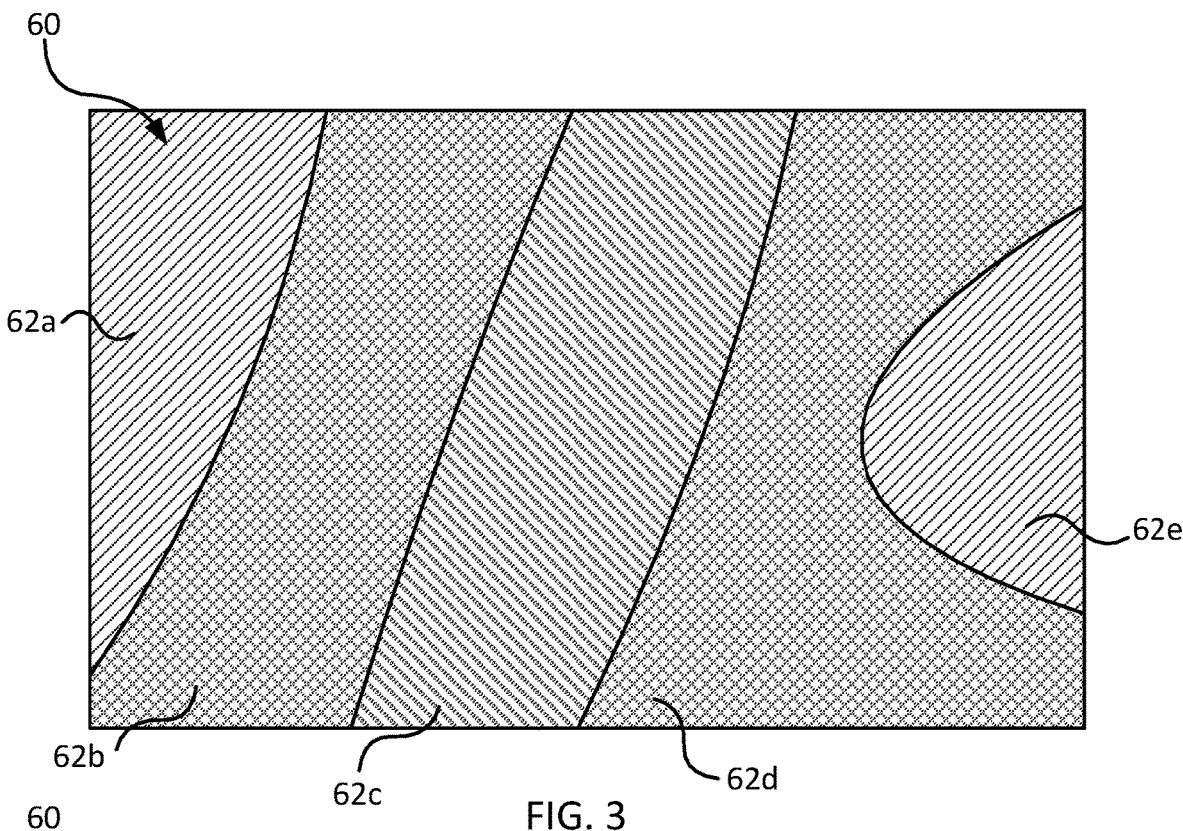
FIG. 3 is a simplified top view of a portion of an agricultural field.

FIG. 3 is a simplified top view of a portion of an agricultural field 60 in which the windrower 10 or another agricultural machine (e.g., a mower) may cut hay. The field 60 may have areas 62a-62e with different properties. Though depicted in FIG. 3 as five distinct areas, those skilled in the art will appreciate that properties of crops may vary continuously across the field 60. Even if each of the areas 62a-62e have a property (e.g., moisture content) within a selected range, that property may vary within that range at different parts of each area 62a-62e. The boundaries between the areas 62a-62e may be known before harvest (e.g., from data collected by a drone, satellite, or other sensor), or may be determined by the data processor 17 using data from the sensor 28 and/or another source (e.g., a drone, satellite, yield map from a prior season, etc.). For example, the boundaries between the areas 62a-6e may correspond to a corrected yield calculated by the data processor 17, based on the mass of hay, the moisture content, the ash content, and/or the protein content.

In some embodiments, the corrected yield $Y_c$ at a point in the field 60 may correspond to a dry organic mass, and may be calculated by the formula: $Y_c=m(1-MC)(1-AC)$, where m is the mass of the hay, MC is the moisture content of the hay, and AC is the ash content of dry hay. The mass m may be expressed per unit area, or on any other convenient basis. The moisture content MC and ash content AC are typically unitless (i.e., the fraction of the total mass that is moisture, and the fraction of the dry mass that is ash, respectively), and thus, the mass m has the same units as the corrected yield $Y_c$. Therefore, if the mass m is expressed per unit area (e.g., kg/m$^2$ or lb/ft$^2$), the corrected yield $Y_c$ may have the same units.

In some embodiments, a corrected protein yield $Y_p$ at a point in the field 60 corresponds to the mass of protein in the hay and may be calculated by the formula: $Y_p=Y_c*PC=m(1-MC)(1-AC)PC$, where PC is the protein content of dry, ash-free hay.

In some embodiments, the hay may be cut in the field 60 with a mower and left in place. In this embodiment, the corrected yield $Y_c$ and/or the corrected protein yield $Y_p$ may be labeled on a map of the field 60 stored in a computer memory. The areas 62a-62e shown in FIG. 3 may each have corresponding yields labeled in this manner.

In some embodiments, the areas 62a-62e themselves may be defined by the corrected yield $Y_c$ and/or the corrected protein yield $Y_p$. That is, ranges of yields may be used to identify "boundaries" between the areas 62a-62e on a map of the field 60. The boundaries between the areas 62a-62e may simply be the set of points at which the yield changes from one range to another, and may not correspond to any single physical or directly observable property. Any selected number of yield ranges may be used.

Figure 4:
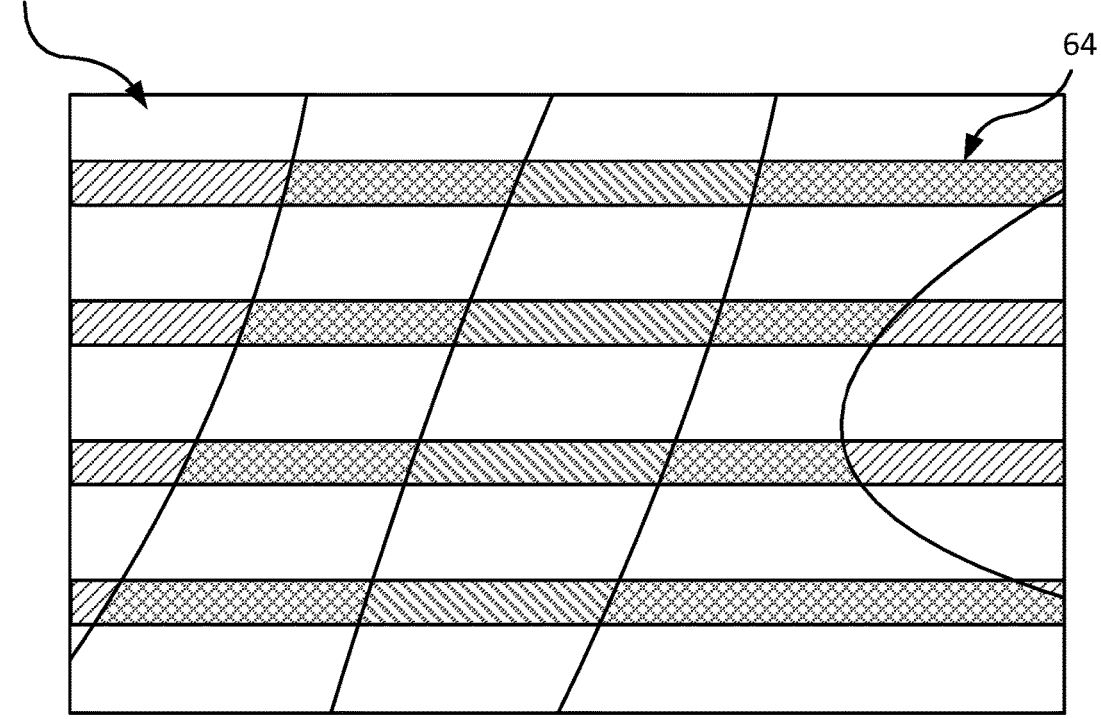
FIG. 4 is a simplified top view of the agricultural field of FIG. 4 after a windrower has cut the hay and formed the hay into windrows.

In certain embodiments, the hay may be cut by a windrower 10 (FIG. 1). FIG. 4 is a simplified top view of the portion of the agricultural field 60 after the windrower 10 has cut the hay and formed the hay into windrows 64 along paths of the windrower 10. Each windrow 64 may have varying corrected yields $Y_c$ and/or corrected protein yields $Y_p$ due to different crop mass m, moisture content MC, ash content AC, and protein content PC of the area of the field 60 from which the windrow 64 is formed. In this embodiment, portions 66a-66e of the windrow 64 may have different corrected yields $Y_c$ and/or corrected protein yields $Y_p$, which may be expressed in units of mass per unit length of the windrow 64.

Figure 5:
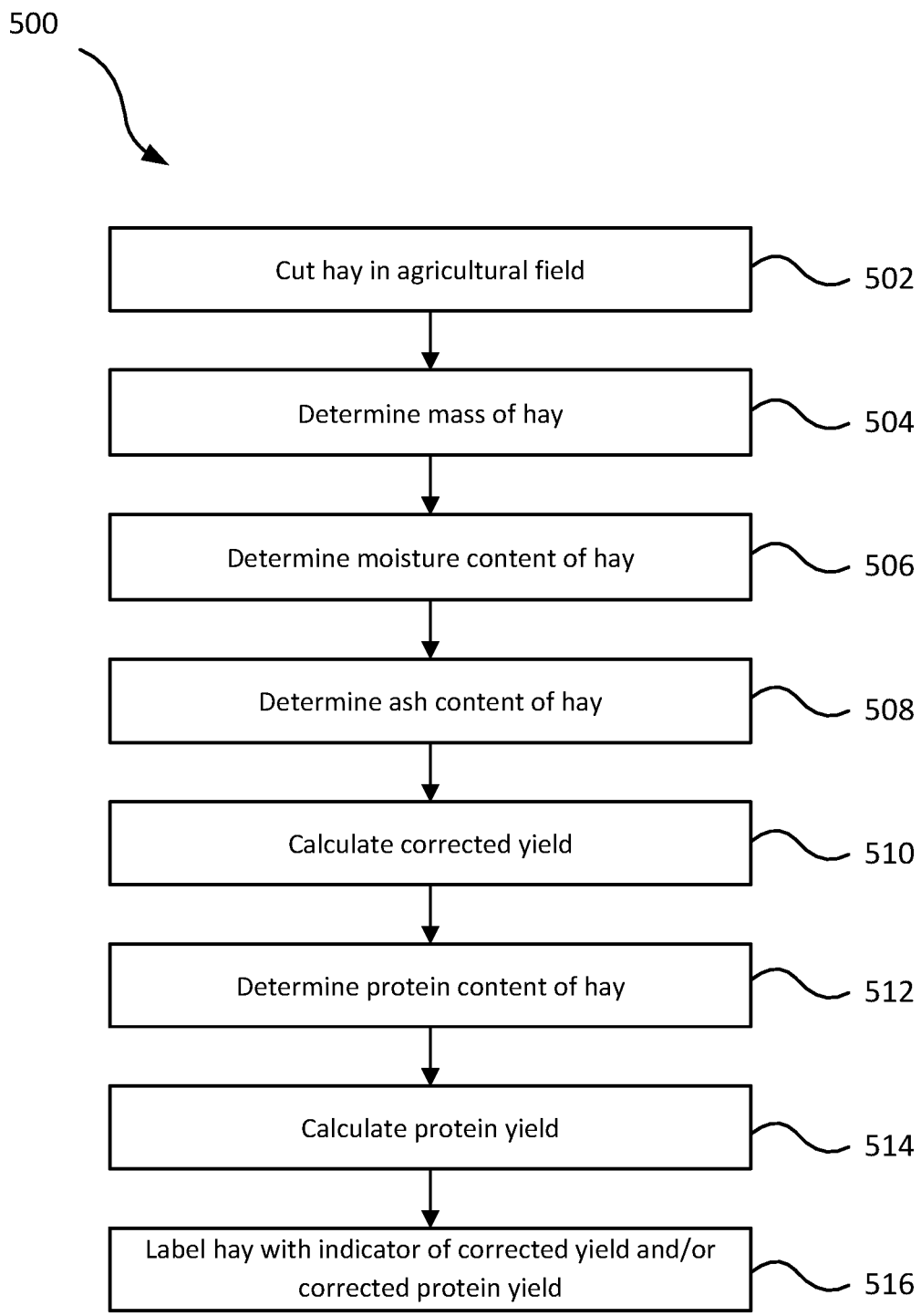
FIG. 5 is a simplified flow chart illustrating a method of determining a corrected yield and labeling hay.

FIG. 5 is a simplified flow chart illustrating a method 500 of determining corrected yields and labeling hay. In block 502, hay is cut in an agricultural field, such as with the windrower 10 shown in FIG. 1. The hay may be formed into a windrow, or may alternatively be spread around the field. Block 504 represents determining a mass of the hay. The mass may be determined by measuring a force of the hay on a swathboard, by analyzing a photograph of the field (e.g., from a satellite, a drone, an airplane, or the windrower 10 itself), or by any other method of determining crop mass. The mass may be measured per unit of field area.

As shown in block 506, the method 500 may include determining the moisture content of the hay, such as by measuring the capacitance of a portion of the hay. The capacitance may be measured as described in U.S. Pat. No. 10,657,433, International Patent Application PCT/IB2021/052877, or International Patent Application PCT/IB2021/052488, referenced above. In embodiments in which the hay is cut with a windrower 10, the moisture content may be measured as the hay passes the swathboard 24.

As shown in block 508, the method 500 may include determining the ash content of the hay, such as by measuring a near-IR signal reflected from a portion of the hay at a near-IR sensor adjacent the hay. In embodiments in which the hay is cut with a windrower 10, the ash content may be measured as the hay passes the swathboard 24.

A corrected yield $Y_c$ may be calculated in block 510 based on the mass, the moisture content, and the ash content. The corrected yield $Y_c$ may be defined as $Y_c=m(1-MC)(1-AC)$, where m is the mass of the hay, MC is the moisture content of the hay, and AC is the ash content of the hay.

In some embodiments, the method 500 may include determining the protein content of the hay, indicated in block 512. The protein content may be measured using a near-IR signal reflected from a portion of the hay at a near-IR sensor adjacent the hay. In embodiments in which the hay is cut with a windrower 10, the protein content may be measured as the hay passes the swathboard 24.

A corrected protein yield $Y_p$ may be calculated in block 514 based on the mass, the moisture content, the ash content, and the protein content. The corrected protein yield $Y_p$ may be defined as $Y_p=m(1-MC)(1-AC)PC$, where m is the mass of the hay, MC is the moisture content of the hay, AC is the ash content of the hay, and PC is the protein content of dry, ash-free hay. If the protein content is measured on another basis (e.g., based on total mass, rather than dry, ash-free mass), the formula defining corrected protein yield may be revised accordingly.

The hay may be labeled with an indicator of the corrected yield $Y_c$ and/or the corrected protein yield $Y_p$, as indicated by block 516. For example, if the hay is formed into windrows, each windrow may be divided into sections that are each labeled with the corrected yield $Y_c$ and/or the corrected protein yield $Y_p$. Two or more of the sections may be combined and an average corrected yield $Y_c$ and/or corrected protein yield $Y_p$ may be calculated and labeled for any selected group of sections. For hay that is left in place in the field (i.e., not formed into windrows), the corrected yield $Y_c$ and/or the corrected protein yield $Y_p$ may be calculated for sections of the field (e.g., for each element of a grid pattern), or for the field as a whole. The label of the corrected yield $Y_c$ and/or the corrected protein yield $Y_p$ may be in the form of a map of the field (e.g., on a display of a computer located in a tractor, a mobile device, or a remote site).

Displaying the corrected yield $Y_c$ and/or the corrected protein yield $Y_p$ on a map in real time may be beneficial because an operator (e.g., of the windrower 10, or of a mower, etc.) may be better able to understand the value of the hay being harvested. The operator may adjust certain operating parameters (e.g., ground speed, height, etc.) to increase the yield. Furthermore, the information may be beneficial for determining an appropriate future time for raking or baling, or for determining how many animals can feed on the hay. In some embodiments, the data processor 17 can change operating parameters of the windrower 10 and/or the header 14 (e.g., a position of one or more of the actuators 38) based on the yield calculations.

Though depicted as a flow chart, the actions in FIG. 5 may be performed concurrently, and in some embodiments, some actions may be omitted.

Figure 6:
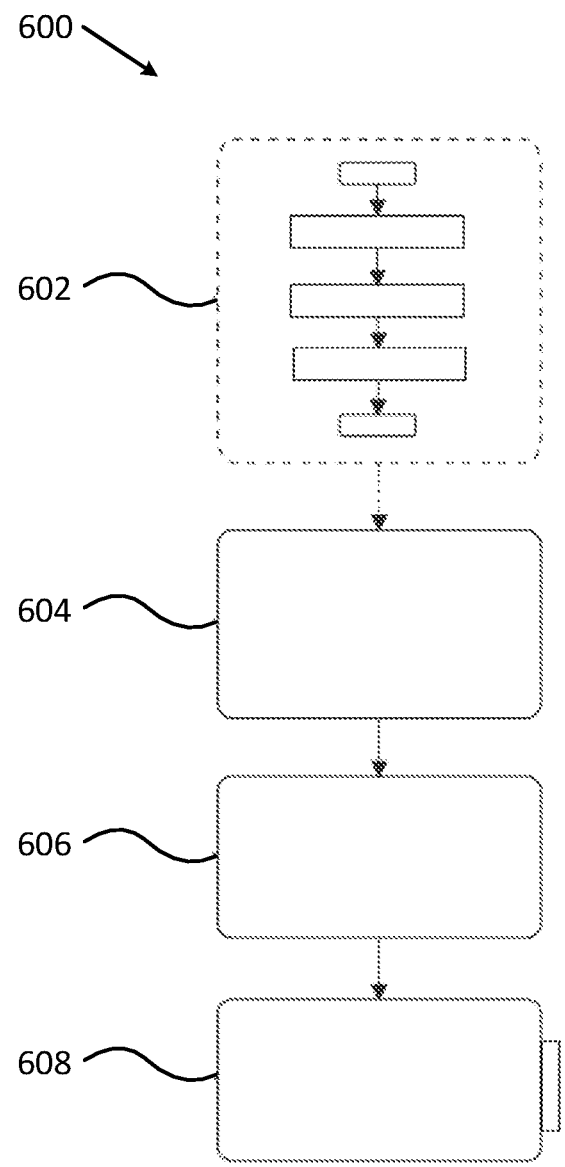
FIG. 6 illustrates an example computer-readable storage medium comprising processor-executable instructions configured to embody one or more methods of determining corrected yield and labeling hay, such as the method illustrated in FIG. 5.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 6, wherein an implementation 600 includes a computer-readable storage medium 602 (e.g., a flash drive, CD-R, DVD-R, application-specific integrated circuit (ASIC), field-programmable gate array (FPGA), a platter of a hard disk drive, etc.), on which is computer-readable data 604. The computer-readable storage medium 602 may be connected to the data processor 17 shown in FIG. 1. This computer-readable data 604 in turn includes a set of processor-executable instructions 606 configured to operate according to one or more of the principles set forth herein. In some embodiments, the processor-executable instructions 606 may be configured to cause a computer associated with the windrower 10 (FIG. 1) to perform operations 608 when executed via a processing unit, such as at least some of the example method 500 depicted in FIG. 5. In other embodiments, the processor-executable instructions 606 may be configured to implement a system, such as at least some of the example windrower 10. Many such computer-readable media may be devised by those of ordinary skill in the art that are configured to operate in accordance with one or more of the techniques presented herein.

Additional non-limiting example embodiments of the disclosure are described below.

Embodiment 1: A method comprising cutting hay in an agricultural field, determining a mass of the hay, determining a moisture content of the hay, determining an ash content of the hay, calculating a corrected yield of the hay, and labeling the hay with an indicator of the corrected yield of the hay. The corrected yield is based on the mass, the moisture content, and the ash content of the hay.

Embodiment 2: The method of Embodiment 1, wherein determining a moisture content of the hay comprises measuring a capacitance of the hay.

Embodiment 3: The method of Embodiment 1 or Embodiment 2, wherein determining an ash content of the hay comprises detecting a signal at a near-IR sensor adjacent the hay.

Embodiment 4: The method of any one of Embodiment 1 through Embodiment 3, further comprising passing the cut hay adjacent a swathboard, wherein determining a mass of cut hay comprises measuring a force of the hay on the swathboard.

Embodiment 5: The method of any one of Embodiment 1 through Embodiment 4, further comprising passing the cut hay adjacent a swathboard, wherein determining the moisture content and determining the ash content comprise determining the moisture content and ash content of the cut hay passing the swathboard.

Embodiment 6: The method of any one of Embodiment 1 through Embodiment 5, further comprising forming the hay into a windrow.

Embodiment 7: The method of Embodiment 6, wherein labeling the hay with an indicator of the corrected yield of the hay comprises dividing the windrow into a plurality of sections and labeling each section with an indicator of the corrected yield.

Embodiment 8: The method of Embodiment 7, further comprising calculating an average corrected yield of the hay in at least two of the plurality of sections of the windrow.

Embodiment 9: The method of any one of Embodiment 1 through Embodiment 8, wherein labeling the hay with an indicator of the corrected yield of the hay comprises displaying a map on a display, the map showing a location of the hay and the indicator of the corrected yield.

Embodiment 10: The method of any one of Embodiment 1 through Embodiment 9, wherein calculating a corrected yield of the hay comprises determining the corrected yield to be $m*(1-MC)*(1-AC)$, wherein m is the mass, MC is the moisture content and AC is the ash content.

Embodiment 11: The method of any one of Embodiment 1 through Embodiment 10, wherein determining a mass of the hay comprises analyzing a photograph of the agricultural field.

Embodiment 12: The method of any one of Embodiment 1 through Embodiment 11, further comprising determining a protein content of the hay, calculating a corrected protein yield of the hay, and labeling the hay with an indicator of the corrected protein yield of the hay. The corrected protein yield is based on the mass, the moisture content, the ash content, and the protein content of the hay.

Embodiment 13: The method of Embodiment 12, wherein determining a protein content of the hay comprises detecting a signal at a near-IR sensor adjacent the hay.

Embodiment 14: The method of Embodiment 13, wherein detecting a signal at a near-IR sensor adjacent the hay comprises passing the hay adjacent the near-IR sensor.

Embodiment 15: The method of Embodiment 14, wherein calculating a corrected protein yield of the hay comprises determining the corrected protein yield to be $m*(1-MC)*(1-AC)*PC$, wherein m is the mass, MC is the moisture content, AC is the ash content, and PC is the protein content.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A method for determining a corrected yield of hay utilizing an agricultural machine, the method comprising:
   cutting, utilizing a cutter of the agricultural machine, hay in an agricultural field;
   determining, utilizing one or more sensors carried by the agricultural machine:
   a mass of the hay;
   a moisture content of the hay; and
   an ash content of the hay;
   calculating a corrected yield of the hay based on the mass, the moisture content, and the ash content of the hay;
   forming the hay into a windrow; and
   labeling the hay with an indicator of the corrected yield of the hay, comprising dividing the windrow into a plurality of sections and labeling each section with an indicator of the corrected yield.

2. The method of claim 1, wherein determining a moisture content of the hay comprises measuring a capacitance of the hay.

3. The method of claim 1, wherein determining an ash content of the hay comprises detecting a signal at a near-IR sensor adjacent the hay.

4. The method of claim 1, further comprising passing the cut hay adjacent a swathboard, wherein determining a mass of cut hay comprises measuring a force of the hay on the swathboard.

5. The method of claim 1, further comprising passing the cut hay adjacent a swathboard, wherein determining the moisture content and determining the ash content comprise determining the moisture content and ash content of the cut hay passing the swathboard.

6. The method of claim 1, further comprising calculating an average corrected yield of the hay in at least two of the plurality of sections of the windrow.

7. The method of claim 1, wherein labeling the hay with an indicator of the corrected yield of the hay comprises displaying a map on a display, the map showing a location of the hay and the indicator of the corrected yield.

8. The method of claim 1, wherein calculating a corrected yield of the hay comprises determining the corrected yield to be $m*(1-MC)*(1-AC)$, wherein m is the mass, MC is the moisture content and AC is the ash content.

9. The method of claim 1, wherein determining a mass of the hay comprises analyzing a photograph of the agricultural field.

10. The method of claim 1, further comprising:
determining a protein content of the hay;
calculating a corrected protein yield of the hay based on the mass, the moisture content, the ash content, and the protein content of the hay; and
labeling the hay with an indicator of the corrected protein yield of the hay.

11. The method of claim 10, wherein determining a protein content of the hay comprises detecting a signal at a near-IR sensor adjacent the hay.

12. The method of claim 11, wherein detecting a signal at a near-IR sensor adjacent the hay comprises passing the hay adjacent the near-IR sensor.

13. The method of claim 12, wherein calculating a corrected protein yield of the hay comprises determining the corrected protein yield to be $m*(1-MC)*(1-AC)*PC$, wherein m is the mass, MC is the moisture content, AC is the ash content, and PC is the protein content.

* * * * *